Jan. 20, 1970 R. W. HENGESBACH 3,490,212
ROTARY LAWNMOWER CLEANER ATTACHMENT
Filed July 13, 1967
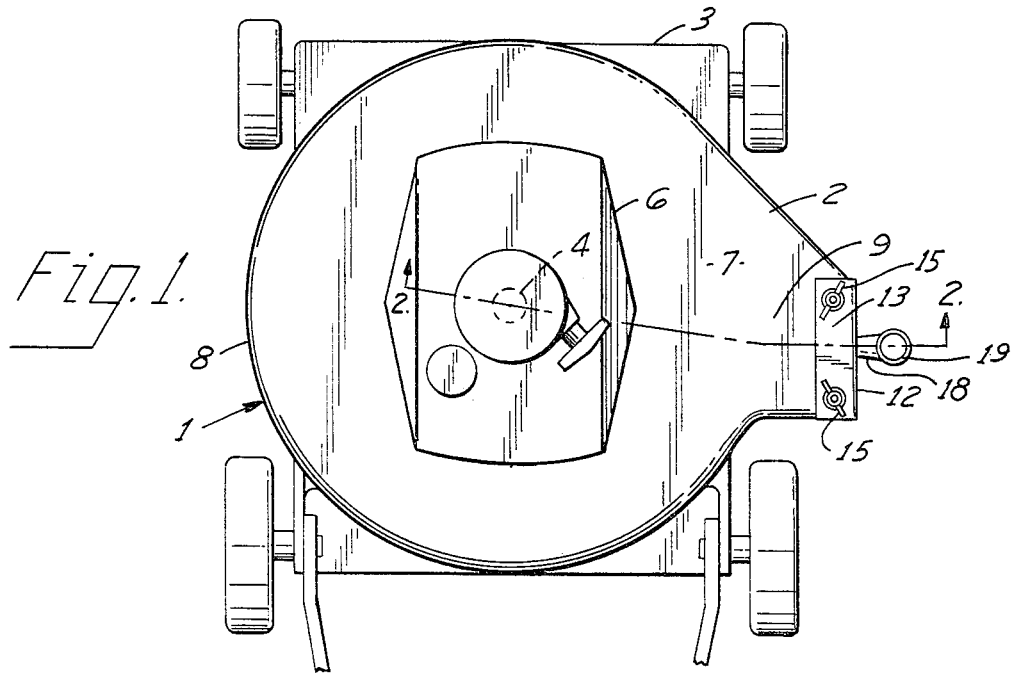
Fig. 1.
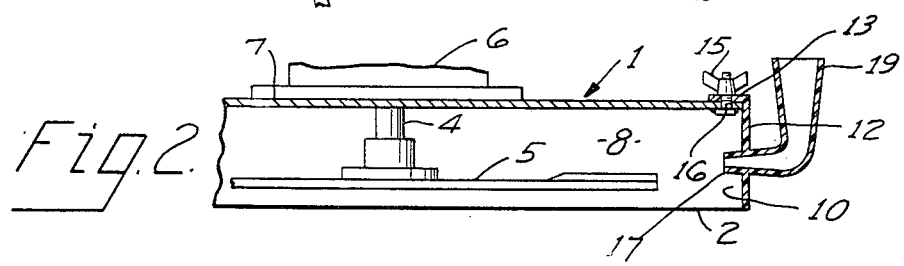
Fig. 2.
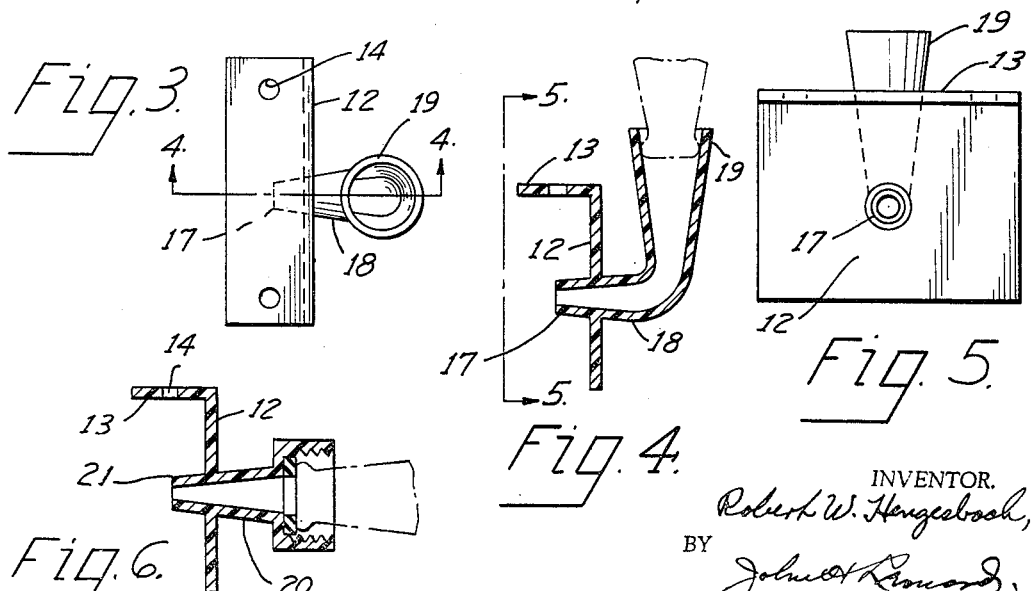
INVENTOR.
Robert W. Hengesbach,
BY
John H. Leonard
his ATTORNEY.

United States Patent Office 3,490,212
Patented Jan. 20, 1970

3,490,212
ROTARY LAWNMOWER CLEANER ATTACHMENT
Robert W. Hengesbach, 7886 Munson Road, Mentor, Ohio 44060
Filed July 13, 1967, Ser. No. 653,218
Int. Cl. A01d 75/00; B05b 15/06
U.S. Cl. 56—25.4                                        5 Claims

ABSTRACT OF THE DISCLOSURE

The invention resides in a closure wall element adapted to be positioned with its inner face in closing relation to the outlet of the blade housing of a rotary lawn mower of the type employing a blade rotatable about an upright axis, and to be detachably secured to the housing, the wall element carrying a nozzle arranged to discharge into the housing through the housing outlet and to direct a stream of water through or above the path of the blade, and including means carried by the element at the outside face for detachably connecting a garden hose to the nozzle.

---

This invention relates to a cleaner attachment for rotary lawnmowers of the type wherein a blade is rotated at high speed in a generally horizontal plane within a wheeled housing having a top wall and depending peripheral wall with a lateral discharge outlet, and to a combination of the attachment with the housing of such a rotary mower.

In the operation of such rotary mowers the severed grass and weeds are discharged from the housing through the lateral discharge outlet which is generally at the outer end of an inverted trough portion of the housing. The trough portion usually extends tangentially relative to the path of the blade so that the grass clippings and the like can be thrown out readily. During cutting, however, the clippings are thrown against the interior surface of the housing and due to the moisture released by the cutting and chopping of the clippings, or the wetted condition of the grass, the clippings tend to accumulate and pack against the interior surface of the housing, thus interfering with the proper cutting and imposing an undue burden on the blades and mower, and interfering with the proper discharge of the cut grass. As the clippings dry on the interior of the housing, they become increasingly difficut to remove.

In order to remove such clippings it has been found effective to discharge a stream of water into the interior of the housing at or above the path of the blades so that the water is struck by the blades and flung outwardly and thus swept over the interior surface of the housing. Heretofore, fittings for this purpose have been provided on the housing and are secured thereto in a manner such that they are generally left permanently in place, except for possible servicing and repair. However, these fittings require that a special hole or opening be provided in the housing.

The present invention is directed to an attachment which can be detachably held in closing relation to the outlet of the housing and which is provided with a conduit and nozzle such that, while the attachment is thus positioned in the closing relation, water from an ordinary garden hose can readily be supplied to the conduit and discharged through the nozzle in proper position for engagement by the blades. The present attachment can be used also when pulverization of the clippings is desired simply by attaching it in the same manner as for cleaning, but without introducing water therethrough.

Another feature of the invention resides in the structure by which a garden hose nozzle may be connected to the inlet end of the conduit for supplying the necessary washing water, and can be readily removed therefrom.

Specific features and advantages will become apparent from the following description wherein reference is made to the drawings in which:

FIG. 1 is a top plan view of the rotary lawnmower with the cleaning attachment of the present invention connected to the housing thereof;

FIG. 2 is an enlarged fragmentary sectional view, taken on the line 2—2 in FIG. 1;

FIG. 3 is an enlarged top plan view of a preferred embodiment of the attachment of the present invention;

FIG. 4 is a vertical sectional view of the attachment and is taken on the line 4—4 in FIG. 3;

FIG. 5 is a left side elevation of the attachment illustrated in FIG. 3; and

FIG. 6 is a side elevation, partly in section, illustrating a modification of the invention.

Referring to the drawings, the attachment is shown as installed on a rotary type lawnmower 1 having a housing 2 and a wheeled frame 3 which supports the housing at the proper position above the ground level. Carried by the housing is an upright drive shaft 4 which at its lower end, within the housing, carries a rotary blade or cutter 5. The shaft is directly driven by a conventional gasoline or other type motor 6 carried by the housing 2. The housing is conventional and in the form of a top wall 7, with a depending peripheral flange or wall 8, and having at one portion an inverted trough 9, the top wall of which may comprise a continuation of the top wall of the housing and the side walls of which may form a continuation of the peripheral side wall of the housing 2. The trough generally is arranged so that its outer side wall is tangent to the peripheral wall of the housing at the portion in which the blade is operated so as to facilitate the centrifugal discharge of cut-off material through the trough by the blade. The trough 9 is open at the bottom, as is the housing, and is open at its outer end to provide an outlet 10.

The attachment of the present invention comprises a closure wall 12 which is arranged to be positioned upright over the outer end of the trough in closing relation to the outlet 10. The wall 12 is provided with suitable attachment means for attaching it to the trough in this closing position.

In the form illustrated, the attachment means comprises a horizontal flange 13 at the upper end of the wall 12 having apertures 14 through which wing bolts 15 are passed. The apertures 14 are positioned so that, with the wall 12 in closing position, they will align vertically with threaded apertures 16 customarily provided in the outer end of the trough for attaching mulching attachments and the like thereto.

Carried by the wall 12 is a flushing nozzle 17 which discharges in a direction inwardly endwise of the trough 9 and at a level above the blades such that the water discharged by the nozzle 17 will be struck by the blades and flung outwardly forcefully against the inner surface of the peripheral wall 8 of the housing and also caused to sweep over the inner surface of the top wall of the housing. In the form illustrated, the nozzle 17 may protrude a distance inwardly from the inner face of the wall 12, but clear of the path of the blade. The nozzle is connected at its inlet end to a conduit 18 which is disposed at the outside of the wall 12 and which has an entry portion 19 arranged for connection to a conventional hose.

In the form illustrated, the wall 12, nozzle 17, conduit 18, and entry portion 19 are integral and comprised of a relatively stiff but somewhat resilient synthetic organic material. Preferably the conduit is arranged with the axis of its entry portion extending upright. In the form illustrated in FIGS. 1 through 4, the entry portion is arranged for substantially instant connection to a garden hose, with or without the hose nozzle. The threaded connecting annulus for the hose nozzles and the nozzles themselves, as provided on garden hoses, are conventional. Usually the nozzle is of the type which can be adjusted to discharge a solid stream or a spreading conical spray, the connecting means for connecting the hose of the entry portion 9 may be provided by forming the inner wall of the entry portion 19 frusto-conical with its larger diameter at the top or outwardly. With such a wall the hose connection can be made simply by pressing the hose nozzle, discharge end foremost, downwardly into the entry portion 19 while the hose nozzle is held with its axis in substantially upright position. If no hose nozzle is on the hose, the threaded annulus may be similarly accommodated and connected, due to the upward taper of the inner wall of the portion 9. Due to the taper of the inner wall of the entry portion 9, the wall itself provides a shoulder means which seats against the periphery of the discharge end of the nozzle or annulus and thus forms a sufficient seal therewith so that substantially all of the water supplied by the hose will pass into the conduit 18 and will be discharged into the interior of the housing in proper relation into and above the path of the blade 5.

While it is possible merely to grasp the entry portion 9 and, using it as a handle, to hold the wall 12 in proper position in closing relation to the outlet 10, this is hazardous in the event, during cleaning, some heavy material is struck by the blade through outwardly. It is best, therefore, to detachably connect the wall 12 to the trough and remove the hands from the danger zone.

In order to use the device, therefore, it is only necessary to position the wall 12 over the outlet of the inverted trough and secure it in place by means of the wing bolts and flange 13, and thereupon, with the motor operating, insert the hose into the entry portion 19 of the conduit 18. The water supplied by the hose will then discharge from the conduit 18 through the nozzle 17 preferably at a level above the level of the blades or upwardly at an angle through the path of the blades.

Referring to the modification in FIG. 6, the same attachment is shown except that the conduit 20 thereof extends radially directly outwardly in coaxial relation to the nozzle 21. As in the case of the entry portion 19, however, the outer end of the conduit is tapered for a like connection to a hose or, if desired, is provided with the usual annular union member so that the threaded annulus on the hose which ordinarily receives the hose nozzle can be connected directly to the conduit 20. The tapered entry portion is desired, however, as normally it requires only a few seconds of flushing to clear the interior of the housing of glass and the like and the time so consumed is less than would be required to couple the hose to the conduit with a threaded union. In both forms, the connection may be made without the necessity of removing the hose nozzle and making a new screw connection. Further, since the end of the entry portion 19 of the conduit is above the level of the housing, there is no danger of the hand which is holding the nozzle in place being struck by any solid objects which may be thrown out through the inverted trough 9.

Having thus described by invention, I claim:

1. A rotary lawnmower having a blade housing comprising a top wall, a peripheral side wall, and an inverted discharge trough, for discharging a stream of air and grass clippings, extending outwardly laterally from the peripheral wall and having an inlet at its inner end in communication with the interior of the housing and having an outlet at its outer end;
    a central generally upright power driven shaft carried by the housing;
    a blade within the housing and connected to the shaft and rotatable therewith in a substantially horizontal plane at a level between the levels of the bottom and the top, respectively, of the outlet;
    characterized in a closure element detachably connected to the trough and having a portion overlying and in closing relation to said outlet;
    a water discharge nozzle carried by the closure element and directed inwardly of the housing through the trough at a level such that water supplied under super-atmospheric pressure to the nozzle will be discharged forcibly into the interior of the housing so as to be engaged and flung by the blade in sweeping relation to the interior surfaces of the walls of the housing; and
    hose connecting means on said nozzle for detachably connecting a water hose to said nozzle.

2. The structure according to claim 1 wherein the closure element comprises an upright wall portion which overlies the outlet, and laterally extending connecting means engaging the trough; and means detachably fastening the laterally extending connecting means to the trough.

3. The structure according to claim 2 wherein the nozzle and hose connecting means are carried by said upright wall portion, and the hose connecting means is disposed at the outside of said upright wall portion.

4. The structure according to claim 3 wherein the hose connecting means comprises a conduit connected at one end to the nozzle and having an entry portion for receiving, discharge end foremost, a garden hose or hose nozzle and for effecting a sealing relation with the periphery thereof at the discharge end thereof.

5. The structure according to claim 4 wherein said entry portion has a frusto-conical inner wall disposed with its large base facing outwardly endwise of the portion.

References Cited

UNITED STATES PATENTS

| 2,936,563 | 5/1960 | Blume | 56—25.4 |
| 3,040,990 | 6/1962 | Gotti | 56—25.4 X |
| 3,097,467 | 7/1963 | Konrad | 56—25.4 |

ROBERT PESHOCK, Primary Examiner

ROBERT F. CUTTING, Assistant Examiner

U.S. Cl. X.R.

239—273